United States Patent [19]

Amundson et al.

[11] Patent Number: 4,889,348
[45] Date of Patent: Dec. 26, 1989

[54] SPIRAL GROOVE SEAL SYSTEM FOR HIGH VAPOR-PRESSURE LIQUIDS

[75] Inventors: Donald E. Amundson, Prospect Heights; Jon B. Hamaker, Schaumburg; Glenn G. Pecht, Chicago; Josef Sedy, Mount Prospect, all of Ill.

[73] Assignee: John Crane-Houdaille, Inc., Morton Grove, Ill.

[21] Appl. No.: 60,215

[22] Filed: Jun. 10, 1987

[51] Int. Cl.[4] ............................................. F16J 15/34
[52] U.S. Cl. .......................................... 277/1; 277/63; 277/65; 277/81 R; 277/96.1
[58] Field of Search ..................... 277/1, 65, 63, 96.1, 277/85, 87, 93 SD, 81 R, 27

[56] References Cited

U.S. PATENT DOCUMENTS

| | | | |
|---|---|---|---|
| 3,499,653 | 3/1970 | Gardner | 277/96.1 X |
| 3,704,019 | 11/1972 | McHugh | 277/96.1 X |
| 3,811,687 | 5/1974 | Honold et al. | 277/65 X |
| 4,212,475 | 7/1980 | Sedy | 277/93 SD |
| 4,290,611 | 9/1981 | Sedy | 277/63 |
| 4,420,162 | 12/1983 | Yanai et al. | 277/96.1 |

FOREIGN PATENT DOCUMENTS 550642 12/1957 Canada .............................. 277/65
356647 10/1961 Switzerland ......................... 277/65

Primary Examiner—Allan N. Shoap
Attorney, Agent, or Firm—Kinzer, Plyer, Dorn, McEachran & Jambor

[57] ABSTRACT

A seal system is disclosed for sealing a housing and rotatable shaft against leakage of high vapor-pressure liquids. The method of sealing contemplates phase change of the liquefied hydrocarbon fluid across a first module. The gas so formed is contained by a second seal module which operates as a dry running gas seal. The seal system has plural, axially spaced spiral-groove seal modules mounted between the shaft and housing. Each seal module has a primary ring affixed to the housing and a mating ring affixed for rotation with the shaft and the modules define an intermediate cavity. The rings have opposed, radially extending faces, one of which has a plurality of downstream pumping spiral grooves extending from one circumference. The grooves of the grooved ring of the upstream module are of a depth not to exceed about 100 micro-inches. In a preferred form, the depth of the grooves of the upstream module do not exceed 50 micro-inches. The groove depth of the grooves of the downstream module is greater than the depth of the grooves of the upstream module and may be as much as 200 micro-inches.

24 Claims, 1 Drawing Sheet

SPIRAL GROOVE SEAL SYSTEM FOR HIGH VAPOR-PRESSURE LIQUIDS

BACKGROUND OF THE INVENTION

This invention relates to seals for preventing leakage of a fluid about a shaft extending through a housing such as a pump. The invention is particularly concerned with a seal for containing high vapor-pressure liquids, such as liquefied light hydrocarbon gases and the method of sealing such fluids.

Prior to this invention, two spaced apart mechanical end face seals have been used for this application. This system was of the "wet," contacting type which had to be cooled by a buffer liquid pumped between the two spaced mechanical seals. The system for circulating the buffer liquid (frequently oil) includes pumps, coolers and reservoirs which add complexity and expense to the apparatus. Further, the mechanical seals, even with their complicated support system, often last only a few days in pumps handling liquefied light hydrocarbons.

It is known that a kind of mechanical end face seals, known as dry running gas seals, can be operated without oil lubrication when one of the faces is provided with a series of spiral grooves. Seals of this type are shown and described in U.S. Pat. No. 4,212,475, issued to Josef Sedy and assigned to the present assignee. The subject matter of this patent is incorporated by reference herein. This latter type of seal has been used to solve gas containment problems.

This invention seeks to provide an end face seal arrangement which is particularly appropriate for use in equipment handling liquids having high vapor-pressure such as liquefied light hydrocarbons. This is accomplished in part by ignoring, to some extent, the conventional wisdom which is to cool the opposing faces of the seal. Instead, the seal is intended to create shear heating of the sealed fluid between the seal faces of a first stage or module which, it is believed, causes phase change of the liquid so that a second stage dry running gas seal is effective to contain the vaporized fluid.

SUMMARY OF THE INVENTION

The present invention is directed to a mechanical end face seal and method which is appropriate for equipment handling liquefied light hydrocarbons or other high vapor-pressure liquids. This is accomplished through the use of a seal arrangement having an upstream seal module and a downstream seal module, each mounted on the shaft and housing. Each seal module has a primary ring affixed to the housing and a mating ring affixed to the shaft. The rings have opposing, radially extending faces, one of which has a plurality of downstream pumping spiral grooves extending from one circumference thereof. The grooves of at least the ring of the upstream module have a depth which is less than has heretofore been considered optimum for dry running gas seals, no more than about 100 micro-inches. The depth of grooves of the second or downstream module is not less than the depth of grooves of the upstream module. The downstream module groove depth is no more than about 200 micro-inches.

In a preferred form, the groove depth of the grooves of the upstream module is about 50 micro-inches and the groove depth of the grooves of the downstream module is about 100 micro-inches.

DESCRIPTION OF THE PREFERRED EMBODIMENT

Figure 1:
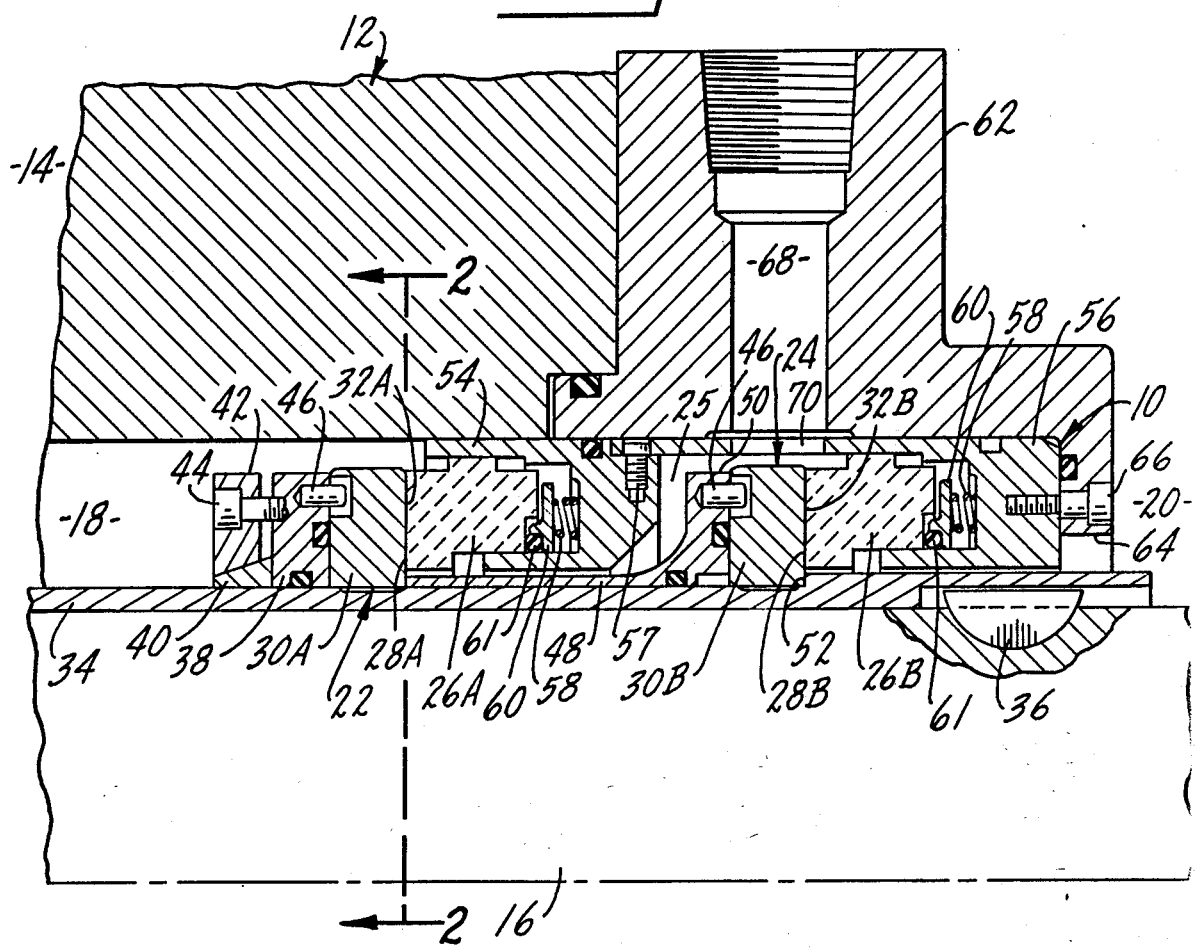
FIG. 1 is a side elevation view in section taken along a vertical center-line of a portion of the preferred embodiment of the invention.

FIG. 1 illustrates a seal designated 10 constructed in accordance with the preferred embodiment of the invention. The seal is designed to contain liquefied light hydrocarbons and other high vapor-pressure liquids such as liquid natural gas (LNG), liquefied petroleum gas (LPG) including methane, ethylene, ethane, propane, butane and pentane within a pump housing. The housing is indicated at 12 enclosing the pump interior 14. A shaft 16 extends through an opening 18 in the housing 12 to the atmosphere 20.

Generally speaking, the seal 10 has a tandem arrangement of spiral groove mechanical end face seals, each having portions mounted on the housing and shaft. The seals are generally of the type shown in the patent referred to above. The tandem seals include an upstream or inside seal module 22 and a downstream or outside seal module 24 which define an annular chamber 25 between them. Each seal module has a pair of annular rings comprising primary rings 26A, 26B with radially extending faces 28A, 28B and mating rings 30A, 30B having radially extending faces 32A, 32B opposite the faces 28A, 28B of the primary rings. The primary rings 26A, 26B are affixed to the housing by a retainer assembly. Similarly, the mating rings 30A, 30B are affixed for rotation with the shaft 16 by a sleeve assembly.

The seal shown is exposed to a fluid to be sealed at the radially outer diameter of the seal components. The principles of the invention, however, are applicable to seals having the high pressure at the radially inner diameter of the relatively rotating seal faces.

The sleeve assembly includes a shaft sleeve 34 which fits upon the shaft 16 and is held against rotation by a drive key 36. Sleeve 34 is fixed to the shaft to prevent outward axial motion of the sleeve by appropriate means (not shown). An O-ring is also positioned at this flange to seal between the sleeve and shaft. The upstream seal module 22 includes a support 38 positioned by an annular split wedge 40 which in turn is held by a clamping ring 42. A cap screw 44 connects the clamping ring 42 and mating ring support 38 to compress wedge 40 against sleeve 34. A pin 46 connects the mating ring 30A to the mating ring support 38. O-rings are provided as shown on the mating ring support.

The sleeve assembly further includes a spacer sleeve 48 which includes a support flange 50, which holds a pin 46 to engage and drive the mating ring 30B of the outboard seal module 24. Again, O-rings are supplied on the flange 50 as shown. The spacer sleeve 48 extends to and engages the radial surface 32A adjacent the inside diameter of the mating ring 30A. Thus, the mating rings 30A, 30B and their respective supports 38 and 50 are locked between the wedge 40 and a shoulder 52 on the shaft sleeve 34.

The retainer assembly comprises inboard and outboard retainers 54 and 56 connected by cap screws 57. The inboard retainer 54 mounts the inboard primary ring 26A. The outboard retainer 56 similarly mounts the outboard primary ring 26B. Each retainer carries multiple springs 58 and disks 60 which urge the primary rings into engagement with the mating rings. The disks 60 and springs 58 permit primary rings 26A and 26B to move axially of the shaft. O-ring seals 61 provide a secondary seal between disks 60 and retainers 54 and 56.

A gland plate 62 connects to housing 12. The plate is attached to the housing by screws (not shown). The gland plate has a flange 64 engaging the outer end face of the retainer 56. The retainer is connected to the flange by cap screws 66. Suitable O-rings are provided as shown to seal the gland plate against the housing 12 and retainers 54, 56. A vent passage 68 communicates with an opening 70 in the retainer 56 and chamber 25. The vent 68 is connectable to a flare stack or other combustion apparatus for disposing of the controlled amount of gas passing across the rotating faces of upstream seal module 24. Such gas may, for example, be used for heating buildings associated with the apparatus containing the seal or recompressed for other uses.

Figure 2:
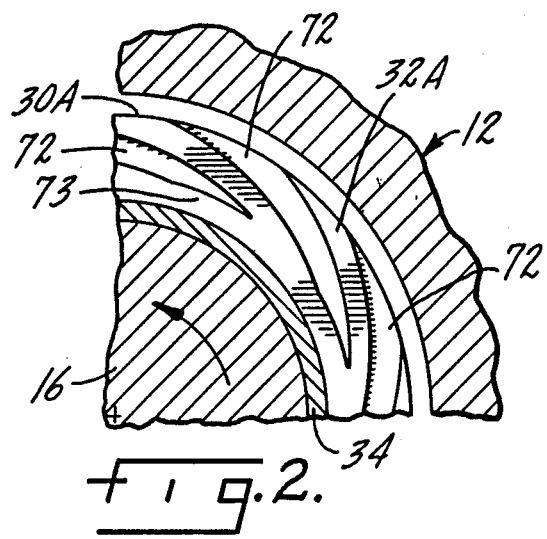
FIG. 2 is an end view of a segment of one of the sealing rings of the preferred embodiment of the invention.

FIG. 2 shows a portion of a mating surface on either the mating ring or primary ring. For purposes of description, the face 32A of mating ring 30A is shown. The face has a plurality of downstream pumping spiral grooves 72 extending from the outer circumference partially across the width of the face 32A. The ungrooved surface 73 defines a sealing dam which provides a contacting static seal when the seal faces are not rotating relative to each other. Face 32B is similarly configured. It has been found that the depth of the grooves on the inside and outside seal modules is critical to acceptable performance when sealing against high vapor pressure liquids such as light hydrocarbons. In particular, it has been found that the groove depth of the upstream seal module should be substantially less than that preferred for dry running gas seals as defined in the aforementioned Sedy patent, and should not exceed 100 micro-inches. The groove depth of the grooved ring of the downstream module should not be less than the groove depth of the upstream module and should not exceed 200 micro-inches.

When the shaft is not rotating, pressurized fluid is retained by contact between the rings at the sealing dam 73. When the shaft starts rotating, the grooves 72 pump fluid between the seal faces causing primary rings to move slightly axially of the shaft. A portion of the liquid enters the resulting gap where it is subjected to high shear stress, which raises the liquid's temperature and causes a change in phase from liquid to gas. The downstream seal module provides a second barrier along the shaft so that escaping gas is forced to flow out the vent 68 where it can be disposed of as previously described. It is also contemplated that if leakage is sufficiently low, no combustion apparatus would be required. Leakage across the downstream seal is minimal and is considered negligible.

A specific embodiment found to give superior results has an upstream seal module ring groove depth of 50 micro-inches and a downstream module ring groove depth of 100 micro-inches. Such a seal has been successful in a LNG plant pump operating at 400 psig, 3600 rpm, 125° F., 2 ⅛ inch shaft diameter with a fluid of 50.5 molecular weight and a vapor pressure of 390 psig at 161° F. It will be understood that these dimensions could vary somewhat with the upstream module groove depth being as much as 100 micro-inches and the downstream module groove depth being as much as 200 micro-inches. The preferred groove depth of the upstream module should be no more than about 50 micro-inches, and the preferred groove depth of the downstream module should be no more than about 100 micro-inches.

With such an arrangement the groove depth at the first seal module is reduced from that heretofore in dry running gas seals. This restricts the flow of liquid across the first module seal interface, thereby increasing the shear stress applied to the liquid. The first seal operates as a means for changing phase from liquid to gas. It is contemplated that this module need not be in a configuration of a dry running gas seal but could be any shear imparting element between the housing and shaft. It is believed that the large shearing action causes stress applied at the first seal module to create a temperature rise which in turn causes a change of phase of the sealed fluid from liquid to gas. The first module thus acts as a heat input component.

Gas which escapes beyond the first seal module is removed through the vent 68 for further use or to a flare. The second seal module 24 operates as a dry running gas seal, much as described in the aforementioned Sedy patent, to prevent leakage beyond the gland plate 62. The net effect of the tandem arrangement is that the inside seal module contains the liquid by adding heat to that quantity which passes across the faces 28A, 32A and converts it to gas, and the outside seal module seals against escape of the gas phase of the fluid.

It is contemplated that in some applications only one module, such as upstream module 22, would be used. The gasified fluid which passes across the faces 28A and 32A would pass to atmosphere.

Whereas a preferred form of the invention has been shown and described, it will be realized that alterations may be made thereto without departing from the scope of the following claims.

We claim:

1. A tandem spiral groove seal system as for sealing a rotatable shaft extending through a housing against leakage of a high vapor-pressure liquid, the system comprising spaced apart upstream and downstream modules, said upstream module comprising means to change the phase of said liquid to be sealed including a seal having a primary ring affixed to the housing and a mating ring affixed for rotation with the shaft one of said rings includes a plurality of downstream pumping spiral grooves extending from one circumference thereof, said downstream module including a primary ring sealingly affixed to the housing and a mating ring affixed to the shaft, the rings of said downstream module having opposed, radially extending faces, one of which has a plurality of downstream pumping spiral grooves extending inwardly from one circumference of the face, wherein the groove depth of the grooves of the downstream module exceeds the groove depth of the grooves of the upstream module.

2. A seal system as claimed in claim 1 wherein said grooves of said upstream seal module are of a depth not to exceed 100 micro-inches.

3. The seal system of claim 2 wherein the downstream seal module groove depth is no more than about 200 micro-inches.

4. The seal system of claim 1 wherein the upstream seal module groove depth is no more than about 50 micro-inches.

5. The seal system of claim 4 wherein the downstream seal module groove depth is up to about 100 micro-inches.

6. The seal system of claim 1 wherein the downstream seal module groove depth is up to about 200 micro-inches.

7. The seal system of claim 1 wherein the upstream seal module groove depth is about 50 micro-inches and the downstream seal module groove depth is about 100 micro-inches.

8. The seal system of claim 1 wherein the upstream seal module groove depth is about half that of the downstream seal module.

9. A tandem seal system for sealing a shaft extending through a housing against leakage of a high vapor-pressure liquid, comprising:

an upstream module mounted on the shaft and housing including means for effecting a phase change of the sealed liquid from liquid to gas as it passes through said module, said means for effecting a phase change including a seal having a primary ring affixed to the housing and a mating ring affixed to the shaft, the rings having opposed, radially extending faces, one of which a plurality of downstream pumping spiral grooves extending from one circumference thereof, a downstream module mounted on the shaft and housing downstream of the upstream module, the downstream seal module comprising a seal having a primary ring affixed to the housing and a mating ring affixed to the shaft, the rings having opposed, radially extending faces, one of which has a plurality of downstream pumping spiral grooves extending from one circumference thereof, the grooves of said upstream module seal being of a depth which is less than the depth of the grooves of said seal of said downstream seal;

and a vent passage in fluid communication with the downstream module and connectable to a combustion means.

10. The seal system of claim 9 wherein the downstream seal module groove depth is no more than about 200 micro-inches.

11. The seal system of claim 9 wherein the upstream seal module groove depth is no more than about 50 micro-inches.

12. The seal system of claim 9 wherein the downstream seal module groove depth is up to about 200 micro-inches.

13. The seal system of claim 9 wherein the upstream seal module groove depth is about 50 micro-inches and the downstream seal module groove depth is about 100 micro-inches.

14. The seal system of claim 9 wherein the upstream seal module groove depth is about half that of the downstream seal module.

15. A method of sealing a rotatable shaft extending through a housing against leakage of a high vapor-pressure liquid comprising the steps of providing a first barrier to the flow one liquid along said shaft, said first barrier having a first radially extending seal face with a plurality of pumping spiral grooves, said first seal face grooves having a first predetermined depth, allowing a portion of said fluid to escape across said barrier, and providing a second barrier to the flow of fluid along said shaft, said second barrier having a second radially extending seal face with a plurality of pumping spiral grooves, said second seal face grooves having a second predetermined depth greater than said first predetermined depth.

16. The method of claim 15 wherein the first barrier groove depth is no more than 50 micro-inches.

17. The method of claim 15 wherein the second barrier groove depth is no more than 200 micro-inches.

18. The method of claim 15 wherein the first barrier groove depth is about 50 micro-inches and the second barrier groove depth is about 100 micro-inches.

19. A tandem spiral groove seal system for sealing a rotatable shaft extending through a housing against leakage of a fluid, the system comprising:

(a) a first upstream module including a primary ring sealingly affixed to the housing and a mating ring affixed to the shaft, the rings having opposed, radially extending faces, one of which has a plurality of pumping spiral grooves extending from one circumference of the face, said spiral grooves of said first module seal face having a first predetermined depth; and (b) a second downstream module spaced apart from said first module, said second module including a primary ring sealingly affixed to the housing and a mating ring affixed to the shaft, the rings having opposed, radially extending faces, one of which has a plurality of pumping spiral grooves extending from one circumference of the face, said spiral grooves of said second module seal face having a second predetermined depth which is greater than said first predetermined depth of said first module seal spiral grooves.

20. The seal system of claim 19 wherein said first predetermined depth is not greater than 100 micro-inches.

21. The seal system of claim 20 wherein said second predetermined depth is greater than said first predetermined depth but not greater than 200 micro-inches.

22. A method for sealing a shaft extending through a housing against leakage of sealed fluids comprising:

providing an upstream mounted on the shaft and housing for sealing said sealed fluid, said upstream seal module comprising a seal having a primary ring affixed to the housing and a mating ring affixed to the shaft, the rings having opposed, radially extending faces, one of which has a plurality of upstream pumping spiral grooves extending from one circumference thereof, said upstream pumping spiral grooves having a first predetermined groove depth;

providing a downstream module mounted on the shaft and housing downstream of the upstream module, the downstream seal module comprising a seal having a primary ring affixed to the housing and a mating ring affixed to the shaft, the rings having opposed, radially extending faces, one of which has a plurality of downstream pumping spiral grooves extending from one circumference thereof, said downstream pumping spiral grooves having a second predetermined groove depth which is greater said first predetermined groove depth of said upstream pumping spiral grooves.

23. The method of claim 22 wherein said first predetermined depth is not greater than 100 micro-inches.

24. The method of claim 23 wherein said second predetermined depth is not greater than 200 micro-inches.

* * * * *